United States Patent [19]

Thomas et al.

[11] 3,719,710

[45] March 6, 1973

[54] PREPARATION OF HYDRAZINOADAMANTANE COMPOUNDS

[75] Inventors: Telfer L. Thomas, Pittsford; Bola Vithal Shetty, Rochester, both of N.Y.

[73] Assignee: Pennwalt Corporation Philadelphia, Pa.

[22] Filed: Sept. 20, 1968

[21] Appl. No.: 761,280

[52] U.S. Cl.....260/563 P, 260/293.54, 260/294.8 B, 260/295 T, 260/296 T, 260/327 R, 260/345.2, 260/468 B, 260/471 A, 260/514 B, 260/518 R, 260/569, 260/999
[51] Int. Cl.............................................C07c 109/02
[58] Field of Search..260/295 H, 296, 563, 569, 514, 260/293 DA, 345.1

[56] References Cited

OTHER PUBLICATIONS

Evans, Rev. Pure Appl. Chem. 12, 146–164 (1962), pp. 146–149 and 161 supplied.

Schleyer et al., J. Am. Chem. Soc. 83, 2,700–2,707 (1961).

Westphal, Ber. 74, 759–776 and 1,365–1,372 (1941).

*Primary Examiner*—Henry R. Jiles
*Assistant Examiner*—G. Thomas Todd
*Attorney*—Charles E. Feeney

[57] ABSTRACT

The preparation of hydrazinoadamantane compounds utilizing the starting materials of a haloadamantane compound with anhydrous hydrazine which are refluxed together at a temperature in the range of 25°–125° C under a stream of nitrogen for a time in the range of 1–24 hours, the formed hydrazinoadamantane is treated with potassium hydroxide solution followed by extraction with ethyl ether and dried. Dry hydrogen chloride is passed into the ether solution and the resulting hydrochloride is filtered off and dried.

9 Claims, No Drawings

PREPARATION OF HYDRAZINOADAMANTANE COMPOUNDS

The present invention relates to a method of preparation of hydrazinoadamantane compounds.

The 1-hydrazinoadamantane compound and other compounds prepared by this method are useful as antiviral agents and as intermediate compounds in the preparation of other pharmacological compounds.

An important object of the present invention is the provision of a method of preparation of hydrazinoadamantanes which is substantially simpler in procedure than prior known methods. As exemplary of prior low yield multi-step processes is that disclosed in the French Pat. No. 1,491,581. The present process provides a one-step direct preparation of the desired product.

Another object of the present invention is the provision of a process for the preparation of hydrazinoadamantanes providing a high yield of the end product. The process provides excellent yields of up to 90–95 percent.

A further object of the present invention is the provision of a process of preparation of hydrazinoadamantanes utilizing starting materials of haloadamantanes and anhydrous hydrazine where these materials are refluxed under a stream of nitrogen to form the end product.

The present invention also comprehends the provision of a process of preparation of hydrazinoadamantane utilizing the starting materials of haloadamantane and silver p-toluenesulfonate in acetonitrile to form an intermediate of adamantyl-p-toluenesulfonate, and this compound is then refluxed with anhydrous hydrazine under a stream of nitrogen to yield the hydrazinoadamantane.

Additional objects and advantages of our invention should be apparent to those skilled in the art from the following description.

The novel process described herein comprises reacting anhydrous hydrazine with a compound of the general formula:

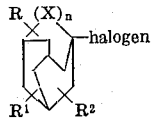

Where R, $R^1$ and $R^2$ = H, halogen, alkyl, phenyl, phenylalkyl, aminoalkyl, adamantyl, haloadamantyl, pyridyl, $-COOR^3$, $-COR^3$, $-OR^3$, $-NR^3R^4$ $X = CH_2$, NR, O, S; $n = 1,2$ $R^3$, $R^4$ = H, alkyl, phenyl, phenylalkyl The halogen radical can be on the 1, 3 or 5 position on the adamantane depending on the desired end product, and more than one halogen radical can be present on the ring.

The compounds provided by this invention are represented by the following general formula:

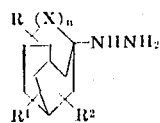

Where R, $R^1$, $R^2$ = H, alkyl, phenyl, phenylalkyl, aminoalkyl, adamantyl, hydrazinoadamantyl, pyridyl, $-COOR^3$, $-COR^3$, $-NR^3R^4$, $-OR^3$ $X = CH_2$, NR, O, S; $n = 1,2$ $R^3$, $R^4$ = H, alkyl, phenyl, phenylalkyl;

where the alkyl group is preferably a lower alkyl, in other words, methyl, ethyl, propyl or the like.

As illustrative of typical derivatives of hydrazinoadamantane are the following which are not meant to be limiting:

1,3-dimethyl-5-hydrazinoadamantane
1-hydrazino-3-methoxyadamantane
2-(3-hydrazinoadamant-1-yl)-1-methylethylamine
1-amino-3-hydrazinoadamantane
3-hydrazino-1-adamantane carboxylic acid
1-hydrazino-3-phenyladamantane
3-hydrazino-1-adamantanol
1-ethyl-3-hydrazinoadamantane
1-hydrazino-3-benzyladamantane
3,3'-bis hydrazino-1,1'-biadamantane
3-hydrazinoadamant-1-yl methyl ketone
1,3-dihydrazinoadamantane
4-(3-hydrazinoadamant-1-yl)-pyridine
1-dimethylamine-3-hydrazinoadamantane
1-isopropylamino-3-hydrazinoadamantane
1-hydrazinohomoadamantane
6-hydrazinohomoadamantane
1-hydrazino-2-azaadamantane
5-hydrazino-2-azaadamantane
1-hydrazino-2-methyl-2-azaadamantane
1-hydrazino-2-oxaadamantane
5-hydrazino-2-oxaadamantane
1-hydrazino-2-thiaadamantane
5-hydrazino-2-thiaadamantane The process of forming the hydrazinoadamantanes comprises reacting a haloadamantane, in other words, bromoadamantane or chloroadamantane with anhydrous hydrazine preferably under a stream of nitrogen, carbon dioxide, argon or other inert gas in a temperature range of 25°–125° C. for a time interval of 1–24 hours. The reaction is generally complete within 1–1½ hours but no harm is done by refluxing for a longer period of time. The reaction can be carried out at higher temperatures under pressure but this is not necessary and does not improve the reaction or the yield. The reaction proceeds very slowly, however, at room temperature and below.

The anhydrous hydrazine is used in excess in the reaction mixture because it is a good solvent for the end product. Also, by using an excess of hydrazine, no disubstituted product is obtained, and the adamantane is unstable in a neutral solution but stable in hydrazine.

After the reaction has been completed, the hot solution is added to an aqueous solution of an alkali metal salt such as potassium, sodium or ammonium hydroxide, sodium chloride; preferably to a cold 45 percent potassium hydroxide solution, which dissolves the excess hydrazine. The hydrazinoadamantane product is extracted with ether, and the ether solution is washed with additional alkali metal hydroxide solution and dried, for example over magnesium sulfate. The purified hydrazinoadamantane in ether solution is then treated with an anhydrous hydrogen chloride to obtain a hydrazinoadamantane hydrochloride, which is filtered off, washed with ether and and dried, for example in vacuo over phosphorus pentoxide and sodium hydroxide. The end product is unchanged by recrystallization from isopropanol. The hydrochloride of the hydrazinoadamantane is stable whereas the hydrazinoadamantane is not stable in the air.

The following examples illustrate the above procedure for forming the 1-hydrazinoadamantane.

EXAMPLE 1

Into a 50 ml. nitrogen flushed flask fitted with a nitrogen inlet tube and a condenser was placed 5.3 gm. 1-bromoadamantane and 30 ml. anhydrous hydrazine. The mixture was stirred magnetically and refluxed under a slow stream of nitrogen for 3 hours (refluxing occurring at approximately 115° C.).

The hot solution was then poured into 125 ml. of cold 45 percent potassium hydroxide solution and extracted with three 100 ml. portions of ethyl ether. The ether solution was then washed with three 100 ml. portions of 45 percent potassium hydroxide solution and dried over magnesium sulfate. Dry hydrogen chloride was passed into the ether solution and the resulting hydrochloride was filtered off, washed with ether and dried in vacuo over phosphorus pentoxide and sodium hydroxide. Obtained was 4.6 gm. of analytically pure product melting at 250°–253° C.; the product being a 93 percent yield.

EXAMPLE 2

Into a flask prepared as in Example 1 was placed 5.3 gm. 1-isopropylamino-3-bromoadamantane and 30 ml. anhydrous hydrazine. The mixture was stirred and refluxed under a stream of nitrogen for 4 hours. The hot solution was added to 125 ml. of cold 45 percent potassium hydroxide solution and the product extracted with three 100 ml. portions of ethyl ether. The ether solution was washed with 100 ml. portions of 45 percent potassium hydroxide solution, dried over magnesium sulfate, and dry hydrogen chloride passed into the ether solution to form the hydrochloride. This product is filtered off, washed with ether and dried in vacuo over phosphorus pentoxide and sodium hydroxide. Yield of 1-isopropylamino-3-hydrazinoadamantane was 90 percent.

In these reactions, the bromoadamantane or other haloadamantane is substituted with the radicals desired in the end product. The hydrazine radical always replaces the halogen radical on the adamantane ring, and the positioning of the hydrazine radical depends on the initial placement of the halogen radical on the ring. From the previously mentioned derivatives, the bromine, chlorine or other halogen can be positioned at the 1, 3 or 5 position on the adamantane, and the utilization of an adamantane having two halogen radicals will provide a disubstituted hydrazinoadamantane. Following the general procedure of Examples 1 and 2 using substituted haloadamantanes, the derivatives of 1-hydrazinoadamantane previously listed will be formed.

The present invention also comprehends an additional two-step method of preparing hydrazinoadamantanes where a tosylate is initially formed and then treated with hydrazine to form the hydrazinoadamantane. In this method, bromoadamantane or other haloadamantane is treated with silver p-toluenesulfonate in acetonitrile and gives a virtually quantitative yield of adamantyl tosylate. When then refluxed with anhydrous hydrazine, a 60 percent yield of hydrazinoadamantane is obtained. The following example illustrates this method.

EXAMPLE 3

Adamantyl p-toluenesulfonate was prepared crude in 98 percent yield as follows: 11.4 gm. of 1-bromoadamantane was added to a 0° C. solution of 14.8 gm. silver p-toluenesulfonate in 150 ml. acetonitrile under protection from light. The reaction mixture was allowed to warm to room temperature (20°–25° C.) over two hours and the precipitated silver bromide was filtered off. The adamantyl p-toluenesulfonate was concentrated to dryness on a rotary evaporator yielding 9.5 gm. product melting at 69°–77° C. Exclusion of water was necessary during the reaction and work up to prevent partial hydrolysis to 1-adamantol.

Conversion of the tosylate to 1-hydrazinoadamantane was accomplished by refluxing the 1-adamantyl p-toluenesulfonate (5 gm.) in 25 ml. of anhydrous hydrazine under a nitrogen stream for 18 hours. The hot solution was poured into 125 ml. of 45 percent potassium hydroxide and the product was extracted with three 100 ml. portions of ether. The ether solution was extracted with three 100 ml. portions of 45 percent potassium hydroxide and dried over magnesium sulfate. The 1-hydrazinoadamantane solution was treated with anhydrous hydrogen chloride yielding 1.9 gm. of 1-hydrazinoadamantane hydrochloride with a melting point of 252°–254° C.; unchanged by recrystallization from isoproponal (30 ml/gm).

Having thus disclosed our invention, we claim:

1. A process for preparing a hydrazinoadamantane which comprises heating a solution made up of: (a) a compound of the following structure:

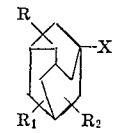

where R, $R_1$, $R_2$, are hydrogen and lower alkyl and X is halogen and p-toulene-sulfonate and (b) excess anhydrous hydrazine.

2. A process as in claim 1 wherein the compound is 1-bromoadamantane.

3. A process as in claim 1 wherein the compound is adamantyl p-toluensulfonate.

4. A process for the preparation of a hydrazinoadamantane which comprises heating a solution made up of: (a) a compound of the following structure:

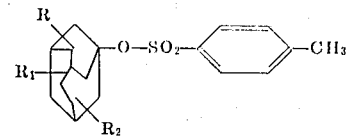

where R, $R_1$, $R_2$ are hydrogen and lower alkyl; and (b) excess anhydrous hydrazine.

5. A process as set forth in claim 1, in which said mixture is reacted in a temperature range of 25°–125° C. over a time range of 1 to 24 hours.

6. A process as set forth in claim 1, in which said mixture is refluxed for 1 to 3 hours under an inert atmosphere.

7. A process as set forth in claim 1, in which said reacted solution is poured into an alkali metal salt solution to dissolve the excess hydrazine and the remaining product is extracted with ether.

8. A process as set forth in claim 7, in which the ether solution is washed with alkali metal salt solution and dried.

9. A process as set forth in claim 8, in which anhydrous hydrogen chloride is added to the dried ether solution to form the stable hydrochloride which is filtered off, washed in ether, and dried in vacuo.

* * * * *